(12) United States Patent
DeWitt et al.

(10) Patent No.: US 8,718,891 B2
(45) Date of Patent: May 6, 2014

(54) SMART FEEL REGENERATIVE BRAKING

(75) Inventors: David S. DeWitt, Torrance, CA (US); Naoya Miyamoto, Tochigi (JP); Ryan Douglas Roy Harty, Long Beach, CA (US); Robert M. Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 13/153,680

(22) Filed: Jun. 6, 2011

(65) Prior Publication Data

US 2012/0310501 A1    Dec. 6, 2012

(51) Int. Cl.
*G06F 19/00* (2011.01)
*G06G 7/00* (2006.01)
*B60T 7/12* (2006.01)
*G05D 1/00* (2006.01)

(52) U.S. Cl.
USPC .................. 701/70; 701/96; 188/2 R

(58) Field of Classification Search
USPC .................. 701/70, 93, 96; 477/182; 188/2 R
See application file for complete search history.

(56) References Cited

U.S. PATENT DOCUMENTS

| 5,378,052 A * | 1/1995 | Yoshino .............................. 303/3 |
| 6,179,395 B1 * | 1/2001 | Schneider ...................... 303/152 |
| 6,487,477 B1 | 11/2002 | Woestman et al. |
| 7,034,482 B2 | 4/2006 | Komiyama et al. |
| 7,113,076 B2 | 9/2006 | Yamamura |
| 2003/0014176 A1 * | 1/2003 | Levine ............................. 701/70 |
| 2004/0167717 A1 * | 8/2004 | Buchanan et al. ............ 701/301 |
| 2005/0267665 A1 | 12/2005 | Iwatsuki et al. |
| 2008/0030313 A1 * | 2/2008 | Obradovich .................. 340/439 |
| 2009/0319107 A1 | 12/2009 | Soma |
| 2011/0071761 A1 * | 3/2011 | Cummings .................... 701/301 |
| 2011/0074204 A1 * | 3/2011 | Kim .................................. 303/3 |

FOREIGN PATENT DOCUMENTS

JP    2005-039908    2/2005

* cited by examiner

*Primary Examiner* — Fadey Jabr
*Assistant Examiner* — Martin Weeks
(74) *Attorney, Agent, or Firm* — Fay Sharpe LLP

(57) ABSTRACT

Methods and systems employing the same for controlling braking characteristics of a vehicle are provided. Expected braking characteristics of the vehicle are received and driving condition data is continuously received. A determination as to whether the expected braking characteristics can be safely applied in view of the driving condition data is continuously made and the expected braking characteristics are applied when they can be applied safely.

10 Claims, 2 Drawing Sheets

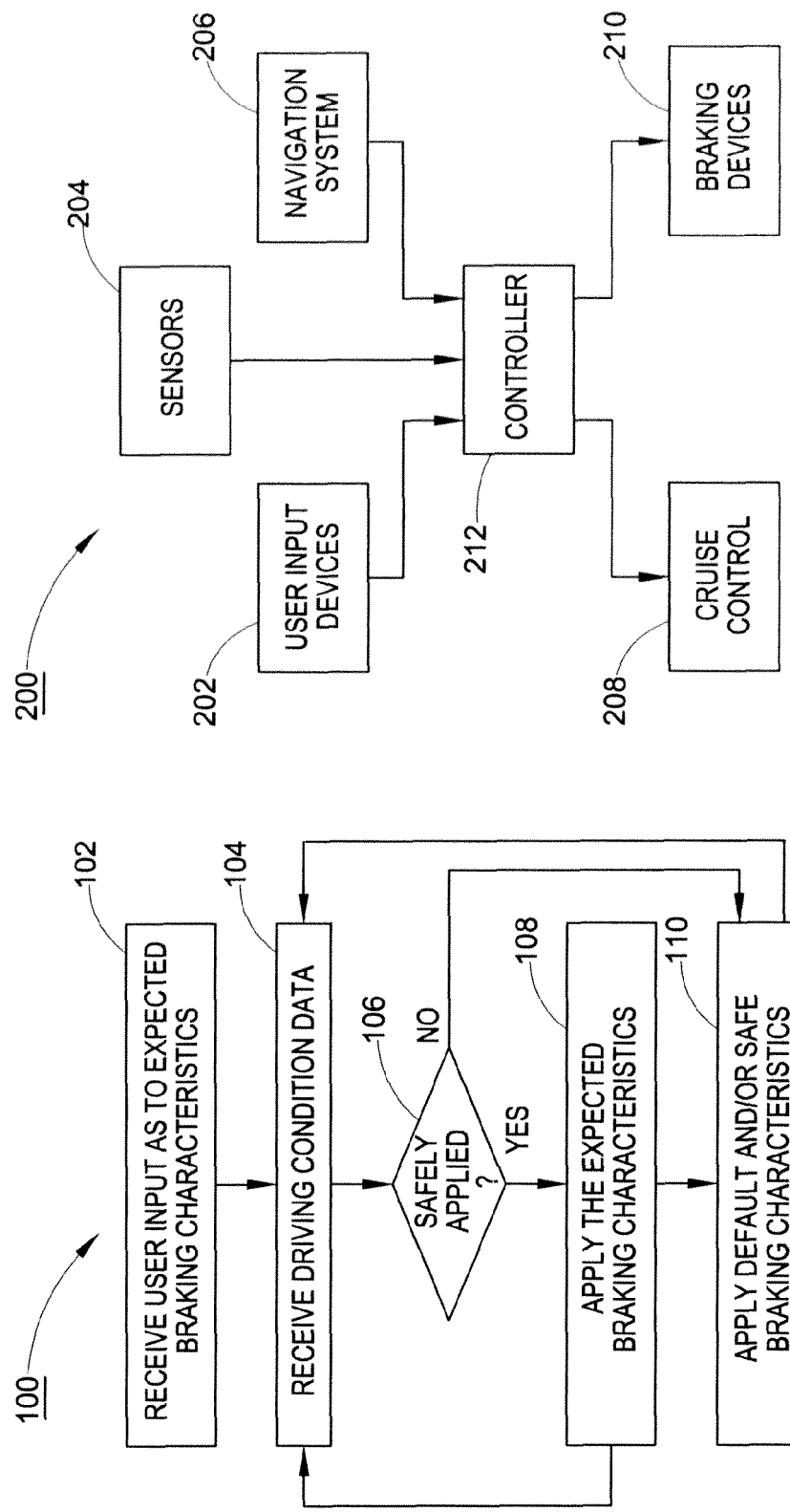

SMART FEEL REGENERATIVE BRAKING

BACKGROUND

The present exemplary embodiments relate generally to vehicles. They find particular application in conjunction with regenerative braking and will be described with particular reference thereto. However, it is to be appreciated that the present exemplary embodiments are also amenable to other like applications.

Regenerative braking recaptures the kinetic energy of a vehicle into a useful form of energy, such as electrical energy, thereby increasing energy efficiency. In contrast, conventional braking dissipates the kinetic energy of a vehicle by heat. Since energy efficiency is becoming increasingly important, regenerative braking will become more prevalent in the future.

Vehicles that use regenerative braking generally have braking characteristics that vary from vehicle to vehicle. During throttle off, some vehicles, usually sporty vehicles, experience an aggressive and/or sporty deceleration, whereas others, usually environmentally friendly vehicles, experience a gentle deceleration. Vehicles with sporty deceleration, for example, can have a strong engine brake feel, whereby the brake lights illuminate without touching the brake pedal. Alternatively, a more conservative vehicle can have a minimum deceleration brake feel that maximizes coasting and places less emphasis on energy regeneration and energy storage.

One problem with having such highly variable braking characteristics is that driver expectations often don't align with the braking characteristics of a vehicle. This can prove dangerous if a driver does not account for this variation and/or pay attention to surrounding driving conditions. Further, one may refrain from purchasing a vehicle because of disdain for the braking characteristics of the vehicle.

The present disclosure contemplates new and improved systems and/or methods for remedying this and other problems.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one aspect of the present disclosure, a method for controlling braking characteristics of a vehicle is provided. Expected braking characteristics of the vehicle are received and driving condition data is continuously received. A determination as to whether the expected braking characteristics can be safely applied in view of the driving condition data is continuously made and the expected braking characteristics are applied when they can be applied safely.

According to another aspect of the present disclosure, a system for controlling braking characteristics of a vehicle is provided. The system includes a user input device, a cruise control system, one or more sensors and a controller. The user input device allows a user of the vehicle to specify expected braking characteristics of the vehicle. The cruise control system can control braking of the vehicle. The sensors monitor driving conditions. The controller controls braking characteristics of the vehicle based upon the expected braking characteristics, receives driving condition data from the sensors, and determines whether the expected braking characteristics can be safely applied in view of the driving condition data.

According to another aspect of the present disclosure, a method for controlling braking characteristics of a vehicle having a regenerative braking is provided. Expected braking characteristics of the vehicle are received and driving condition data is continuously received. A determination as to whether the expected braking characteristics can be safely applied in view of the driving condition data is continuously made. The expected braking characteristics are applied to regenerative braking when the expected braking characteristics can be applied safely and regenerative braking is disabled when the expected braking characteristics cannot be applied safely.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which:

FIG. 1 is a flow chart of a method for controlling braking characteristics of a vehicle according to aspects of the present disclosure;

FIG. 2 is a block diagram of a system for controlling braking characteristics of a vehicle according to aspects of the present disclosure; and, FIGS. 3A and 3B illustrate the use of systems and/or a method for controlling braking characteristics of a vehicle according to aspects of the present disclosure.

DETAILED DESCRIPTION

Figure 3A:
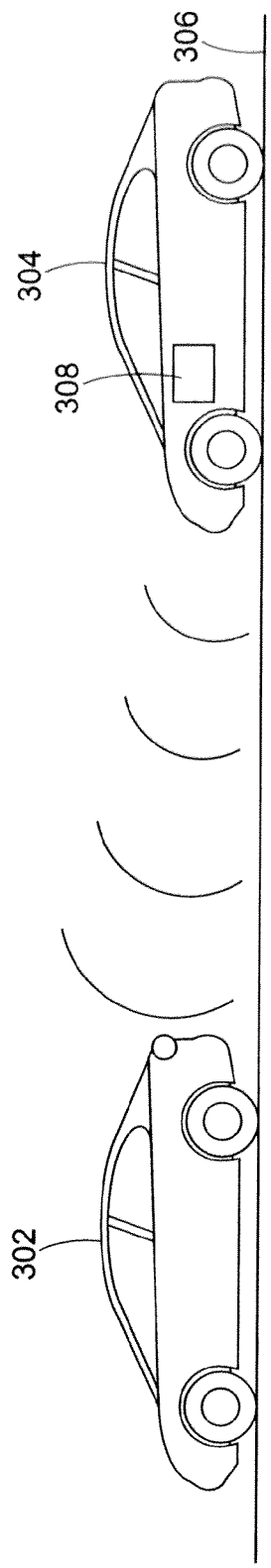

One or more embodiments or implementations are hereinafter described in conjunction with the drawings, where like reference numerals are used to refer to like elements throughout, and where the various features are not necessarily drawn to scale.

With reference to FIG. 1, a flow chart of a method 100 for controlling braking characteristics of a vehicle is illustrated. The vehicle suitably, but not necessarily, employs a regenerative braking system. The method 100 may include receiving 102 expected braking characteristics, receiving 104 driving condition data, determining 106 whether the expected braking characteristics can be safely applied, applying 108 the expected braking characteristics when the expected braking characteristics can be safely applied, and applying 110 default and/or safe braking characteristics when the expected braking characteristics cannot be safely applied.

The receipt 102 of the expected braking characteristics suitably includes receiving the expected braking characteristics from a user input device. The user input device may include one or more of a button, a switch, a touch screen, a mouse, a keyboard, and the like. In certain embodiments, the expected braking characteristics range from sporty braking characteristics to environmentally friendly braking characteristics. Sporty braking characteristics may include quick deceleration (i.e., high G) upon braking and/or coasting, and environmentally friendly braking characteristics may include slow deceleration (i.e., low G).

The receipt 104 of the driving condition data suitably includes receiving the driving condition data from one or more of sensors, wireless communications systems, navigation systems, and the like. The driving condition data may include data pertaining to one or more of vehicle speed, vehicle distance from surrounding objects, upcoming turns and stops, topography, road type, road conditions, weather conditions, and the like. As will be seen, the driving condition data facilitates a determination as to whether the expected braking characteristics can be safely applied.

Driving condition data pertaining to vehicle distance from surrounding objects may include data pertaining to the distance of the vehicle from objects in front of the vehicle and/or behind the vehicle. Further, driving condition data pertaining to vehicle speed may include data pertaining to the absolute speed of the vehicle and the speed of the vehicle relative to other objects. As to both types of data, objects may include vehicles, trees, walls, and the like.

The determination 106 as to whether the expected braking characteristics can be safely applied suitably uses the driving condition data and/or the expected braking characteristics to make such a determination. Essentially, the determination 106 looks to whether the expected braking characteristics can be safely applied given the driving conditions. While any number of approaches may be employed to determine whether the expected braking characteristics can be safely applied, the determination 106 suitably includes calculating one or more safe driving distances and determining whether actual distances are within allowed variances from the safe driving distances. A safe driving distance may be the distance needed to safely apply the expected braking characteristics given the driving conditions. The safe driving distances may include a safe driving distance in front of the vehicle and/or a safe driving distance behind the vehicle.

The calculation of the safe driving distances is suitably based on the driving condition data and/or the expected braking characteristics. The calculation may use one or more of a heuristic, a probabilistic model, a weighted summation, and the like. However, regardless of how the calculation is performed, the following guidelines generally apply.

As to the expected braking characteristics, the more aggressive the expected braking characteristics, the less distance needed in front of the vehicle. Further, the more aggressive the expected braking characteristics, the more distance needed behind the vehicle. Advantageously, consideration of this may allow avoidance of rear collisions from careless drivers.

As to driving condition data, the greater the vehicle speed, relative and/or absolute, the more distance needed in front of and/or behind the vehicle. Further, the greater the incline of a downward slope, the more braking distance needed, and the greater the incline of an upward slope, the less braking distance needed. Even more, the less traction a vehicle has, the more braking distance needed. Traction may be affected by road type, road condition, weather conditions, and the like. Finally, the presence of upcoming stops and turns reduces available braking distance.

The determination as to whether actual distances are within allowed variances from the safe driving distances assesses whether the actual distance is close enough to the safe driving distance for safety. Suitably, the variances are plus and/or minus a percentage of the safe driving distance. In certain embodiments, a driver of the vehicle may set the amount of variance allowed. As should be appreciated, it generally follows that the less the variance, the safer a driver of the vehicle is.

If the driving conditions are such that the expected braking characteristics can be safely applied, the expected braking characteristics are applied 108. Application 108 of the expected braking characteristics brings the current braking characteristics of the vehicle, whether it is braking or not, in line with the expected braking characteristics. As discussed below, there a number of ways of applying the expected braking characteristics.

In certain embodiments, application 108 of the expected braking characteristics may include sending adjustment commands to a cruise control system, a braking control system, such as a regenerative braking control system, or like systems controlling braking. Suitably, the adjustment commands set the braking characteristics of the vehicle to the expected braking characteristics. In such embodiments, braking is not actually controlled; rather, the braking characteristics are merely adjusted. Therefore, it falls to the receiver of the adjustment commands to coordinate braking appropriately.

In other embodiments, application 108 of the expected braking characteristics may include sending deceleration commands to a cruise control system, a braking control system, one or more braking units, or the like. In such embodiments, the application 108 of the expected braking characteristics suitably includes receiving braking data regarding braking events, determining whether to brake based on the braking data and the expected braking characteristics, and sending deceleration commands when braking should commence. Suitably, the deceleration commands are such that they match the expected braking characteristics.

The receipt of braking data may include receiving braking data from one or more of an accelerator pedal, a brake pedal, and the like. The braking events may include release of the of the accelerator pedal, depression of the brake pedal, and other like events typically triggering braking. The determination as to whether to brake varies depending upon the expected braking characteristics. For example, when the expected braking characteristics are sporty, release of the accelerator pedal may trigger braking, and when the expected braking characteristics are environmentally friendly, release of the accelerator pedal may not trigger braking. The sending of deceleration commands includes actually engaging braking. This is in contrast with the previously described adjustment commands, which don't actually engage braking. The deceleration commands may be sent to any device of the vehicle capable of braking the vehicle. Such devices may include, for example, a cruise control system, a braking controller, a regenerative braking controller, and the like.

In certain embodiments, application 108 of the expected braking characteristics may include enabling a regenerative braking system. In some of such embodiments, the expected braking characteristics may be applied to only the regenerative braking system, thereby leaving it to a traditional braking system, such as a friction braking system, to handle braking when the expected braking characteristics cannot be safely applied.

If the driving conditions are such that would be dangerous to apply the expected braking characteristics, default and/or safe braking characteristics may be applied 110. Safe braking characteristics are suitably determined from the driving condition data. In certain embodiments, the safe braking characteristics may be the expected driving characteristics augmented for safety. Advantageously, this would allow driver expectations to be most closely fulfilled, while at the same time maintaining safety.

Suitably, the default and/or safe braking characteristics are applied as described in connection with the expected driving characteristics. However, in certain embodiments, application 110 of the default and/or safe braking characteristics may include disabling a regenerative braking system. In some of such embodiments, the default and/or safe braking characteristics may be applied to only a traditional braking system, such as a friction braking system.

In view of the discussion heretofore, the braking characteristics of the vehicle may vary as the driving conditions change. For example, it may be that during a first period of time the expected braking characteristics can be safely applied, but during a second period of time the expected braking characteristics cannot be safely applied, whereby default and/or safe braking characteristics are applied.

With reference to FIG. 2, a block diagram of a system 200 for controlling braking characteristics of a vehicle is provided. The vehicle suitably, but not necessarily, employs a regenerative braking system. The system 200 may include one or more user input devices 202, one or more sensors 204, a navigation system 206, a cruise control system 208, one or more braking devices 210, and a controller 212.

The user input devices 202 may allow a user of the system to select expected braking characteristics for the vehicle. Suitably, the expected braking characteristics range from sporty braking characteristics to environmentally friendly braking characteristics. The user input devices 202 may include one or more of a button, a switch, a touch screen display, a mouse, a keyboard, and the like. In certain embodiments, the user input devices 202 may further allow the system 200 to detect braking events, such as depression of a brake pedal and/or an accelerator. In such embodiments, the user input devices may further include a brake pedal, an accelerator pedal, and the like.

The sensors 204 may provide the controller 212 with driving condition data necessary to safely adjust the braking characteristics of the vehicle. Suitably, the sensors 204 include a front proximity sensor, a rear proximity sensor, and a speed sensor. However, other sensors are equally amenable. For example, sensors monitoring one or more of road conditions, road type and weather conditions may be employed.

The navigation system 206 may provide the controller 212 with driving condition data that may be used to adjust the braking characteristics of the vehicle. This driving condition data may include data pertaining to one or more of upcoming turns and stops, topography, road type, road conditions, weather conditions, and the like. The navigation system may use GPS technology and/or other like technologies to determine the driving condition data.

The cruise control system 208 may include the ability to control braking of the vehicle. This ability to control braking may be indirect by way of a braking control system or direct. Further, the cruise control system 208 may control braking using regenerative braking, friction braking, or the like. Suitably, the cruise control system 208 is receptive to adjustment commands varying braking characteristics of the vehicle and/or deceleration commands instructing braking of the vehicle. The cruise control system 208 may be an adaptive cruise control system, but other types of cruise control systems are equally amenable.

The braking devices 210 may include the vehicle brakes and suitably allow direct control thereof. Similar to the cruise control system 208, the braking devices 210 may be receptive to deceleration commands instructing braking of the vehicle. The deceleration commands may instruct the braking devices to begin braking via the vehicle brakes. In certain embodiments, the braking devices 210 may include a regenerative braking system, where deceleration commands allow direct control thereof.

The controller 212 suitably implements one or more aspects of the method 100 of FIG. 1 to control the braking characteristics of the vehicle. The controller 212 may control the braking characteristics via the cruise control system 208, the braking devices 210, or other like systems and/or devices for controlling braking. To control the braking characteristics of the vehicle, the controller 212 may send adjustment commands to the cruise control system 208 instructing the cruise control system 208 as to the braking characteristics to apply when a braking event occurs. Additionally, or alternatively, the controller 212 may send deceleration commands to the cruise control system 208 and/or the braking devices 210 instructing the cruise control system 208 and/or the braking devices 210 to decelerate the vehicle according to the expected driving characteristics.

In certain embodiments, the controller 212 may include one or more processors and one or more storage mediums having computer executable instructions executed by the processors. In such embodiments, the computer executable instructions may include computer executable instructions embodying one or more aspects of the method 100 of FIG. 1. In other embodiments, the controller 212 implements one or more aspects of the method 100 of FIG. 1 using one or more of an ASICs, comparators, Boolean logic gates, and the like.

With reference to FIG. 3, an illustration of systems and/or a method for controlling braking characteristics of a vehicle according to aspects of the present disclosure is provided. Therein, a first vehicle 302 and a second vehicle 304 are traveling along a road 306, where the second vehicle 304 is following the first vehicle 302. The second vehicle 304 suitably includes a system 308 for controlling braking characteristics of the second vehicle 304, such as the system 200 of FIG. 2. Further, a driver of the second vehicle 304 has suitably instructed the system 308 that environmentally friendly braking characteristics are expected.

As shown in FIG. 3A, the second vehicle 304 approaches the first vehicle 302, whereby the driver lets off the accelerator and/or lightly taps the brakes, of the second vehicle 304. The system 308 suitably determines the distance between the second vehicle 304 and the first vehicle 302 is sufficient to safely apply environmentally friendly braking characteristics. As such, the second vehicle 304 may simply begin coasting with little, if any, braking (friction based or regenerative based).

Figure 3B:
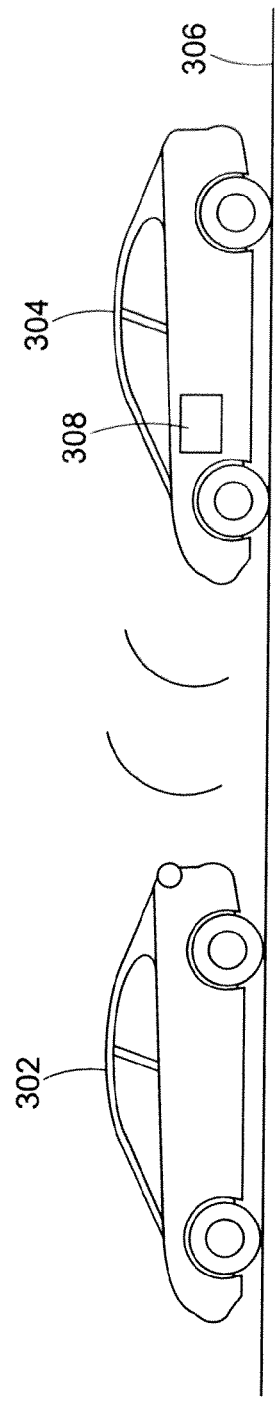

As shown in FIG. 3B, the second vehicle 304 approaches the first vehicle 302, whereby the driver lets off the accelerator and/or lightly taps the brakes, of the second vehicle 304. However, in contrast to with FIG. 3A, the second vehicle 304 is much closer to the first vehicle 302 now. Therefore, the system 308 suitably determines the distance between the second vehicle 304 and the first vehicle 302 is insufficient to safely apply environmentally friendly braking characteristics. As such, the system 308 may apply more aggressive braking characteristics.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:

1. A method for controlling braking characteristics of a vehicle, said method comprising:
receiving by a controller expected braking characteristics of the vehicle;

continuously receiving by the controller driving condition data;

continuously determining by the controller whether the expected braking characteristics can be safely applied in view of the driving condition data;

applying by the controller the expected braking characteristics when they can be applied safely; and, applying by the controller at least one of a default braking characteristic and a safe braking characteristic when the expected braking characteristics cannot be applied safely;

wherein the determining includes:

calculating one or more safe driving distances based on at least one of the driving condition data and the expected braking characteristics; and, determining whether actual driving distances are within allowed variances from the safe driving distances.

2. The method of claim 1, wherein the vehicle includes regenerative braking.

3. The method of claim 1, wherein the expected braking characteristics are one of sporty braking characteristics and environmentally friendly braking characteristics.

4. The method of claim 1, wherein the driving condition data includes data pertaining to distance between objects around the vehicle.

5. The method of claim 1, wherein the driving condition data includes data pertaining to speed of the vehicle.

6. The method of claim 1, wherein the driving condition data includes data pertaining to upcoming turns and stops.

7. The method of claim 1, wherein the driving condition data includes data pertaining to topography.

8. The method of claim 1, wherein the driving condition data includes data pertaining to one or more of road type, road conditions, and weather conditions.

9. The method of claim 1, wherein the application of the expected braking characteristics includes enabling regenerative braking.

10. The method of claim 1, wherein the safe driving distances include a safe driving distance in front of the vehicle and a safe driving distance behind the vehicle.

* * * * *